Aug. 10, 1965   E. J. GRANIUS   3,199,607
ATTACHMENT FOR GARDEN TRACTOR
Filed Jan. 13, 1964   2 Sheets-Sheet 1
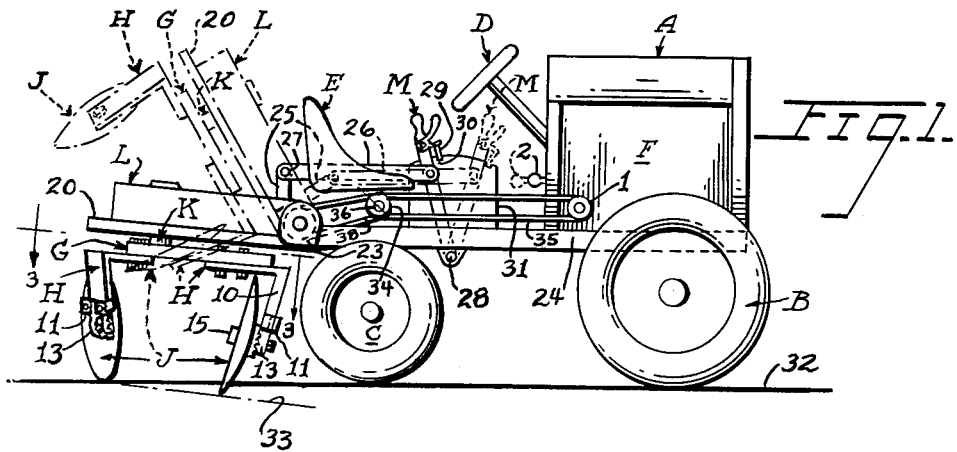
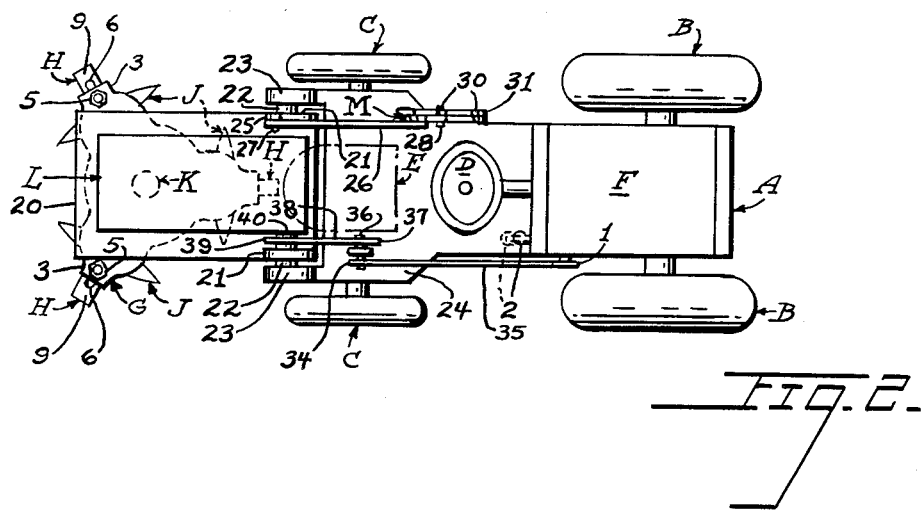
INVENTOR
EMIL J. GRANIUS
BY William R. Piper
ATTORNEY Aug. 10, 1965    E. J. GRANIUS    3,199,607
ATTACHMENT FOR GARDEN TRACTOR
Filed Jan. 13, 1964    2 Sheets-Sheet 2

INVENTOR
EMIL J. GRANIUS
BY William R. Piper
ATTORNEY

3,199,607
ATTACHMENT FOR GARDEN TRACTOR
Emil J. Granius, 1969 Tyler St., San Pablo, Calif.
Filed Jan. 13, 1964, Ser. No. 337,258
1 Claim. (Cl. 172—111)

The present invention relates to improvements in an attachment for a garden tractor, and it consists in the combination, construction and arrangement of parts as hereinafter described and claimed.

An object of my invention is to provide an attachment for a garden tractor which will break and till the soil by the orbital rolling of coulters or discs. The discs will orbit in a plane that is inclined with respect to the ground surface and the inclination is such that the discs in moving through portions of their orbital travel that extend in the direction of movement of the tractor will dig deeper into the ground than the same discs will dig when they have orbited 180° further. The deeper digging of the coulters or discs will break up the soil and then the lesser depth of digging of the same coulters or discs during portions of their circular paths 180° later will cause them to smooth over and till the soil that has already been broken. Moreover the deeper ground penetration of the coulters or discs during their forward portions of their orbital paths will tend to move the attachment and tractor forwardly in the direction of the forward movement of the tractor. A minimum of engine power is needed to rotate discs inclined in this manner.

The discs are mounted on radially extending arms and these arms are adjustably secured to a common rotating member. The disc-carrying arms may be adjusted angularly from a radially-extending direction to alter the rake of the discs and the discs themselves may be adjusted on their supporting arms to alter their pitch. It is possible to retract or extend the disc-carrying arms to vary the width of the ground area contacted by the discs. The device may be used for digging soil on which grass is growing.

A further object of my invention is to provide an attachment of the type described which is simple in construction and is durable and efficient for the purpose intended. The attachment not only can be swung into different angular positions with respect to the ground, but it also can be swung into an inoperative position when it is desired to transport the tractor from one place to another. The attachment can be used with two or four-wheeled tractors and it may be placed at the front or rear or at any other place desired.

Other objects and advantages will appear as the specification continues. The novel features of the invention will be set forth in the appended claims.

Drawings:

For a better understanding of my invention, reference should be made to the accompanying drawings, forming part of this specification, in which:

FIGURE 1 is a side elevation of my attachment, shown operatively connected to a four-wheeled garden tractor.

FIGURE 2 is a top plan view of FIGURE 1.

While I have shown only the preferred form of my invention, it should be understood that various changes, or modifications, may be made within the scope of the annexed claims without departing from the spirit thereof.

Detailed description

In carrying out my invention I make use of a garden tractor of two or four wheels. The drawings illustrate a four-wheeled tractor indicated generally at A. This tractor has its power-driven traction wheels B placed at the front of the tractor. The smaller steerable wheels C are placed near the rear of the tractor. A manually-controlled steering wheel D is operatively connected by means, not shown, to the steerable wheels C so that an operator sitting in a tractor seat E can steer the tractor in the desired direction by manipulating the steering wheel D.

An engine, indicated generally at F, is carried by the tractor A and may be operatively connected to the traction wheels B by any means, not shown, this means being controlled by the operator in the usual manner. The engine F has a power take-off pulley shown at 1 in FIGURES 1 and 2, and a manually controlled clutch, not shown, connects the pulley to the engine for rotating the former when a clutch actuating handle 2 is moved by the operator from the full to the dotted line position. Any other means for connecting the engine F to the drive pulley 1 may be used.

Figure 3:
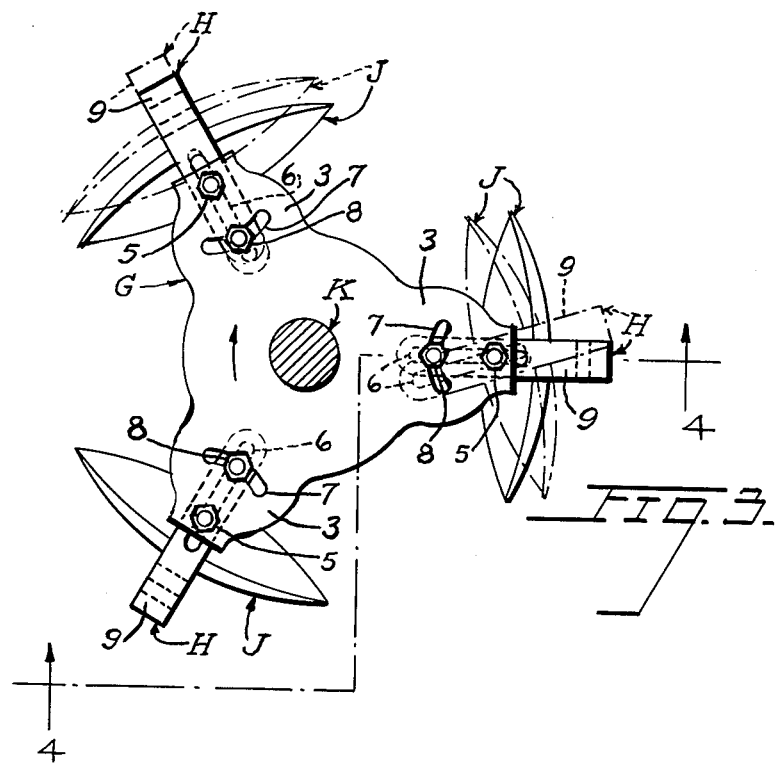
FIGURE 3 is an enlarged top plan view of a portion of my tractor attachment and is taken along the line 3—3 of FIGURE 2.
Figure 4:
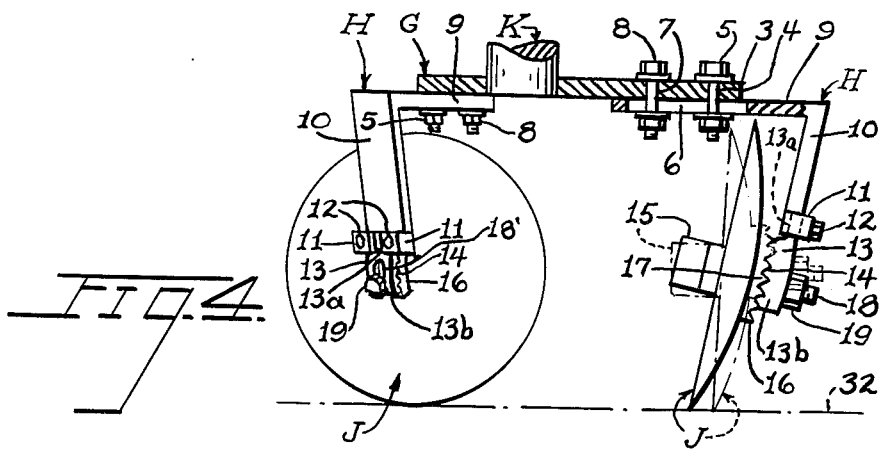
FIGURE 4 is a vertical section of FIGURE 3 and is taken substantially along the line 4—4 of that figure.

I will now describe my ground-digging and tilling attachment. In FIGURES 3 and 4, I show a triple arm rotatable member indicated generally at G. This member has three radially extending integral arms 3 and the arms are equally spaced from each other. I do not wish to be confined to any exact number of arms because two or more could be used. Each arm 3 supports a coulter-carrying arm H and since each of the coulter or disc-carrying arms is identical, a description of one will suffice for all.

It will be seen from FIGURES 3 and 4 that the triple arm member G has each of its integral arms 3 provided with an opening 4. This opening receives a bolt 5 or other suitable fastening means for pivotally and adjustably securing the coulter or disc carrying arm H to the arm 3. The coulter-carrying arm has an elongated slot 6 therein and this slot receives the bolt 5.

The arm 3 also has an arcuate slot 7 therein whose center is the axis for the opening 4. A bolt 8 or other suitable fastening means extends through the arcuate slot 7 and also extends through the elongeated slot 6 in the coulter-carrying arm H. When the bolts 5 and 8 are loosened, the radially extending portion 9 of the coulter-carrying arm can be adjusted radially with respect to the triple arm member G and in this way a coulter or disc J can be moved in a radial direction either toward or away from a vertical axis of a drive shaft K that is keyed or otherwise secured to the triple arm member G. In this way the width of the strip of ground that is engaged by the coulter J can be varied. In FIGURE 3, I show one of the coulter-carrying arms H moved into an extended position and this is indicated by the dot-dash lines in this figure.

The arcuate slot 7 permits the coulter-carrying arm H to be swung angularly about the bolt 5 as a pivot, the bolt 8 sliding in the slot 7 during this swinging movement. FIGURE 3 also shows one of the coulter-carrying arms H swung into an angular position as indicated by the dot-dash lines. This will swing the coulter or disc J which is carried by the arm H into a different angle. This particular change of angle is called rake. Each one of the three coulter-carrying arms H can be swung angularly to the same degree and then the bolts 5 and 8 may be tightened for securing the arms in their adjusted angular positions.

Reference to FIGURES 3 and 4 further illustrates that each coulter-carrying arm H not only has radially extending portions 9, but in addition has a downwardly and inwardly inclined portion 10. This depending portion 10 has inwardly facing angle-shaped ends 11—11 that are spaced apart. These channel-shaped ends 11 have threaded bores therein for receiving cap screws 12. A T-shaped member 13 is provided for each coulter-carrying arm H and the transverse part 13a of the T-shaped member is received in the channel-shaped ends 11. When the cap screws 12—12 are tightened in place, they will secure the T-shaped members 13 to the downwardly extending portions 10 and in this way the members 13 are securely fastened to the coulter-carrying arm H.

FIGURE 4 shows the depending part 13b of the T-shaped member 13 as being provided with an arcuate shaped row of teeth 14. The coulter J is rotatably carried by a bearing 15 and this bearing has a part 16 provided with an arcuate row of teeth 17. The bearing 15 also has a journal 18 that extends through the piece 16 and also extends through a slot 18' in the T-shaped member 13. The outer end of the journal 18 is threaded for receiving a nut 19.

With this construction it is possible to rotatably support the coulter J on the depending portion 10 of the coulter-carrying arm H and to adjust the pitch of the coulter as indicated by the dot-dash line position of one of the coulters in FIGURE 4. The operator in changing the pitch of the coulter first loosens the nut 19 sufficiently to free the teeth 17 from the teeth 14. The operator may now move the member 16 relative to the portion 13b until the desired pitch angle is attained. The piece 16 may now be moved toward the portion 13b and the teeth 17 will again engage with the teeth 14. The nut 19 may now be tightened and the coulter will be rotatably secured in its new pitch position.

It will be seen from the particular structure described that coulters J can be moved toward the axis of the drive shaft K or away from the axis. Also the coulters can have their rake angle changed as well as their pitch angle. Referring to FIGURE 1, it will be seen that the drive shaft K extends from a gear reduction mechanism indicated generally at L. The gear reduction mechanism is mounted on a platform 20 and this platform has a pair of integral projections or ears 21, see FIGURE 2, that are spaced from each other and are provided with aligned openings for receiving a pair of stub shafts 22. The axes of the stub shafts 22 are aligned with each other and the outer ends of these stub shafts are received in aligned openings in a second pair of ears 23 that are integral with the chassis 24 of the garden tractor A. The pair of ears 23 for the chassis 24 are shown provided at the rear of the garden tractor A. This will position the platform 20 at the rear of the tractor. It is possible to mount the platform at the front of the tractor or at any desired position between the front and the rear of the device.

Again referring to FIGURES 1 and 2, it will be seen that the platform 20 can be tilted in different angular positions, the platform swinging about the aligned axes of the stub shafts 22. Any desired mechanism may be used for swinging the platform 20 and for holding it in adjusted position and this means may be either hydraulic or mechanical.

A mechanical means is illustrated in FIGURES 1 and 2 and it comprises an upstanding arm 25 that is rigidly secured to the platform 20. A link 26 has one end pivotally secured to the top of the upstanding arm 25 and has its other end pivoted at 27 to a manually-actuated lever M. The lever is pivoted at 28 to the chassis 24 of the garden tractor A. The lever M has a manually actuated locking bolt 29 that is adapted to enter any desired one of a number of recesses 30 provided in a quadrant 31. The quadrant is mounted on the tractor chassis 24.

I have shown the platform 20 in FIGURE 1 supported in a slightly inclined position so that the left hand or rear end of the platform is supported at a slightly higher elevation than is the right hand end. This will cause the coulters J to dig deeper into the ground 32 during the forward portion of their orbit made by the coulters as they are carried through a circle by the rotation of the drive shaft K and the triple arm member G. FIGURE 1 shows the right hand coulter J digging into the ground 32 to a point indicated by a dot-dash line 33 that is inclined with respect to the ground level line 32. When the coulters make their rearmost portion of their orbit, the inclination of the platform 20 and the corresponding inclination of the triple arm member G will cause the lower edges of the coulters to be tangent with the surface 32 of the ground.

The garden tractor will move to the right of FIGURE 1 while being operated and when the platform 20 is tilted at the angle shown in this figure, the coulters J during their forward arcuate swing will dig into the ground to cultivate it and the same coulters during their rearmost swing 180° later will be raised so that their lower edges will be at ground level 32. This will cause the coulters during this portion of their orbit to level off the soil that has just been dug. In addition, the digging effect of the forward swinging arc portions taken by the coulters will have a tendency to move the garden tractor forwardly or to the right in FIGURE 1. In fact when the platform 20 is mounted on a two-wheeled garden tractor rather than a four-wheeled device, the forward pull of the coulters as they dig into the ground during the forward swinging arcs made by the orbiting coulters will create a forward force on the moving tractor which will aid the operator in moving the device forwardly over the ground.

When the attachment is not to be used and the operator desires to swing it into an inoperative position, he can move the manually actuated lever M forwardly from the full line to the dot-dash line position shown in FIGURE 1 and then cause the bolt 29 to enter a slot 30 which is at the extreme right hand edge of the quadrant 31 and is aligned with the bolt. This movement will swing the platform 20 into the upwardly and rearwardly inclined position illustrated by the dot-dash lines in FIGURE 1. All of the coulters J will be raised above the ground level 32 and the garden tractor A may now be transported to any place desired under its own power.

Any means for rotating the drive shaft K may be used. In FIGURES 1 and 2, I show the power take-off pulley 1 which is operated by the tractor engine F and this pulley is connected to an idler pulley 34 by an endless belt 35. The idler pulley 34 is mounted on a stub shaft 36, see FIGURE 2 and this stub shaft has a second idler pulley 37 keyed thereto. An endless belt 38 operatively connects the second idler pulley 37 to a third idler pulley 39. This third pulley is keyed to a shaft 40 that operates the speed reducing mechanism L. The construction is such that regardless of the angle of the platform 20 with respect to the chassis 24 of the garden tractor A, the drive shaft K can be operatively connected to the tractor engine F when the clutch actuating handle 2 is moved from the full to the dot-dash line position.

It is possible to cultivate the ground right up to a fence or other obstruction. In order to accomplish this, the operator swings the control lever M to the left of the full line position shown in FIGURES 1 until the platform 20 is inclined downwardly and rearwardly from the common axes of the stub shafts 22. The member G, and the orbiting discs J will be swung so that the lower arcuate portions of the discs will move in a plane that is oppositely inclined from that of the plane 33. This will cause the orbiting discs to dig deeper into the ground during the arcuate portions of their orbital travel that are furthest removed from the rear of the tractor.

The operator can back the rear of the tractor A toward the fence or other obstruction (not shown), i.e. to the left in FIGURE 1 until the discs J in their most rearward orbital swing will just clear the obstruction. The digging of the soil by the discs can in this way be carried up to practically the edge of the obstruction with no harm being done to the tractor and attachment or to the obstruction.

The discs in a disc harrow have tilling qualities and only a rake setting can be used. The discs in a common disc plow have plowing and ground-breaking efficiency. My invention has both of the advantages of the disc harrow and the common disc plow because the discs in my invention can have their rake setting changed as well as their pitch setting changed. Although it could be said at this point the disc harrow and the disc plow also have features in common, it is widely known that the high degree of efficiency (uncommon to the disc harrow) is reserved to the disc plow with its rake and pitch setting of disc coulter as used in my tilling device.

The highest degree of tilling efficiency is obtained by mounting my attachment at the rear of a four-wheeled tractor as illustrated in FIGURES 1 and 2 or by mounting it at the center of the tractor. The garden tractor is large enough to support the operator and it does not necessarily require an increased horse power in the engine to carry the operator as well as operate the attachment.

I claim:

1. The combination with a garden tractor of an attachment therefor comprising:
   (a) a platform pivotally connected to said tractor so that the leading and trailing edges of said platform will extend at right angles to the line of tractor travel during its forward movement;
   (b) platform swinging and holding means operatively connected to said tractor and said platform for adjustably holding said platform in an inclined position with the trailing platform edge being disposed at a greater distance above the ground than the leading edge;
   (c) a drive shaft rotably carried by said platform, the axis of the shaft being substantially normal to the plane of said platform; and extending an angle to the surface of the ground;
   (d) a member secured to said shaft and being rotatable thereby, the plane of said member paralleling the plane of said platform;
   (e) said member having a plurality of arms that extend radially from said shaft axis;
   (f) a plurality of disc-carrying arms equal in number to the number of arms on said member; each disc-carrying arm rotatably supporting a disc;
   (g) adjustable means for securing said disc-carrying arms to the arms of said member;
   (h) said means permitting said disc-carrying arms to be moved toward or away from the axis of said drive shaft for spacing the discs the desired distance from said drive shaft axis; and
   (i) said means including means pivotally connecting said disc-carrying arms to said member arms for permitting said disc-carrying arms to be swung about said pivot means into desired angular positions with respect to radial lines extending from said pivot means to said drive shaft axis and to be secured in this position, this adjustment regulating the rake angle of the discs;
   (j) the vertical extent of said disc carrying-arms and said disc being such that the oil-engaging portions of said discs move in a plane when said shaft is rotated that parallels the plane of said member and said platform and that is inclined with respect to the surface of the ground;
   (k) the discs being carried by their arms at points that will cause the discs when swinging through orbital portions of their arcs that are disposed near to the leading edge of said platform to dig deeper into the ground for tilling the ground as the tractor moves forwardly, and the same discs, when 180° later in their orbital swing, will have their lower edges positioned substantially level with the ground surface and will level the previously tilled portion of the ground as the tractor advances;
   (l) said platform swinging and holding means operable for inclining said platform in the opposite direction so that the leading platform edge is disposed higher with respect to the ground surface, than the trailing platform edge; whereby
   (m) the soil-engaging portions of said discs will dig deeper into the ground during the orbital arc portions that are disposed near to the trailing edge of said platform than during the orbital arc portions that are disposed near to the leading edge of said platform; the tractor operator causing the tractor to back up when the platform is so inclined in the opposite direction.

References Cited by the Examiner

UNITED STATES PATENTS

| 834,680 | 10/06 | Pelton | 172—603 |
|---|---|---|---|
| 905,786 | 12/08 | Biesenthal | 172—603 |
| 1,776,612 | 9/30 | Bagan | 172—119 X |
| 1,837,595 | 12/31 | Stoltz et al. | |
| 1,841,906 | 1/32 | Nelson et al. | 172—119 |
| 2,027,910 | 1/36 | Herring | 172—111 |
| 2,619,017 | 11/52 | Stephenson | 172—111 |
| 3,115,190 | 12/63 | Listiak | 172—523 |
| 3,130,794 | 4/64 | Lovell et al. | 172—523 |

FOREIGN PATENTS 1,215,302  11/59  France.

ABRAHAM G. STONE, *Primary Examiner.*

T. GRAHAM CRAVER, *Examiner.*